US012811717B2

United States Patent
Li et al.

(12) United States Patent
(10) Patent No.: US 12,811,717 B2
(45) Date of Patent: Nov. 24, 2026

(54) COMMUNICATION METHOD AND APPARATUS, STORAGE MEDIUM, AND COMPUTER PROGRAM

(71) Applicant: HUAWEI TECHNOLOGIES CO., LTD., Shenzhen (CN)

(72) Inventors: Yunbo Li, Shenzhen (CN); Jian Yu, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/601,246

(22) Filed: Mar. 11, 2024

(65) Prior Publication Data

US 2024/0223302 A1 Jul. 4, 2024

Related U.S. Application Data

(63) Continuation of application No. PCT/CN2022/093067, filed on May 16, 2022.

(30) Foreign Application Priority Data

Sep. 13, 2021 (CN) ........................ 202111071907.3

(51) Int. Cl.
*H04L 1/00* (2006.01)

(52) U.S. Cl.
CPC ............ *H04L 1/001* (2013.01); *H04L 1/0008* (2013.01); *H04L 1/0079* (2013.01)

(58) Field of Classification Search
CPC ...... H04L 1/001; H04L 1/0008; H04L 1/0079
See application file for complete search history.

(56) References Cited

U.S. PATENT DOCUMENTS 11,849,452 B2 * 12/2023 Lim ..................... H04B 7/0452
12,218,750 B2 * 2/2025 Lim ...................... H04L 1/0003
(Continued)

FOREIGN PATENT DOCUMENTS

CN 108234093 A 6/2018

OTHER PUBLICATIONS

IEEE Std 802.11 2016, IEEE Standard for Information technology-Telecommunications and information exchange between systems Local and metropolitan area networks-Specific requirements Part 11: Wireless LAN Medium Access Control (MAC) and Physical Layer (PHY) Specifications, Dec. 7, 2016, total 3534 pages.
(Continued)

*Primary Examiner* — Jael M Ulysse
(74) *Attorney, Agent, or Firm* — WOMBLE BOND DICKINSON (US) LLP

(57) ABSTRACT

This application discloses a communication method and apparatus. A first station generates a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, m<26 or m=26, and m is a positive integer. The first station sends the first frame to a second station. In this solution, the first station can provide more types of control information, and flexibly aggregate other types of control information.

15 Claims, 7 Drawing Sheets

(56) References Cited

U.S. PATENT DOCUMENTS

| | | | | |
|---|---|---|---|---|
| 2006/0018268 | A1* | 1/2006 | Kakani | H04W 28/06 370/278 |
| 2018/0220357 | A1* | 8/2018 | Kim | H04L 5/0048 |
| 2020/0389259 | A1* | 12/2020 | Zhang | H04L 1/1893 |
| 2021/0112451 | A1 | 4/2021 | Patil et al. | |
| 2021/0136605 | A1 | 5/2021 | Huang et al. | |
| 2021/0176643 | A1* | 6/2021 | Jang | H04W 16/10 |
| 2021/0211931 | A1* | 7/2021 | Seok | H04L 69/22 |
| 2021/0250133 | A1* | 8/2021 | Chun | H04L 1/00 |
| 2021/0337537 | A1* | 10/2021 | Chun | H04W 4/70 |
| 2021/0337564 | A1* | 10/2021 | Kwon | H04W 72/0446 |
| 2021/0410048 | A1* | 12/2021 | Yu | H04J 11/0086 |
| 2022/0030604 | A1* | 1/2022 | Noh | H04W 72/121 |
| 2023/0122438 | A1* | 4/2023 | Noh | H04W 72/121 370/329 |
| 2024/0031836 | A1* | 1/2024 | Huang | H04W 74/002 |
| 2024/0172044 | A1* | 5/2024 | Patil | H04L 1/1621 |
| 2025/0106733 | A1* | 3/2025 | Chun | H04L 27/26 |
| 2025/0287293 | A1* | 9/2025 | Yu | H04J 11/0053 |
| 2026/0032682 | A1* | 1/2026 | Huang | H04W 72/20 |

OTHER PUBLICATIONS

IEEE P802.11be D0.3 Draft Standard for Information technology-Telecommunications and information exchange between systems Local and metropolitan area networks Specific requirementsPart 11: Wireless LAN Medium Access Control (MAC) and Physical Layer (PHY) SpecificationsAmendment 8: Enhancements for extremely high throughput (EHT), Jan. 2021, total 196 pages.

* cited by examiner

| Variant | B0 | B1 | B2 - B29 | B30 | B31 |
|---|---|---|---|---|---|
| HT | 0 | Middle part of an HT control field | | AC restrictions | RDG/More PPDUs |
| VHT | 1 | 0 | Middle part of a VHT control field | AC restrictions | RDG/More PPDUs |
| HE | 1 | 1 | Aggregation control field A-Control | | |

FIG. 3

| | Control list | Padding part |
|---|---|---|
| Bit: | Variable | 0 or more |

FIG. 4

| | B0 B3 | |
|---|---|---|
| | Control identifier | Control information |
| Bit: | 4 | Variable |

FIG. 5

| Value of a control identifier | Meaning | Length of a control information subfield (bit) | Content of the control information subfield |
|---|---|---|---|
| 15 | ~~Ones need expansion surely (Ones need expansion surely, ONES)~~ Control information corresponding to the control identifier=15 includes an extended control subfield | 26 | ~~Set to all 1s~~ See control information in an extended control subfield in 9.2.4.6a.xx |

FIG. 6

| | Extended control list | Padding part |
|---|---|---|
| Bit: | Variable | 0 or more |

| | Extended control identifier | Control information |
|---|---|---|
| Bit: | Variable | Variable |

COMMUNICATION METHOD AND APPARATUS, STORAGE MEDIUM, AND COMPUTER PROGRAM

CROSS-REFERENCE TO RELATED APPLICATIONS

This application is a continuation of International Application No. PCT/CN2022/093067, filed on May 16, 2022, which claims priority to Chinese Patent Application No. 202111071907.3, filed on Sep. 13, 2021. The disclosures of the aforementioned applications are hereby incorporated by reference in their entireties.

TECHNICAL FIELD

This application relates to the field of communication technologies, and in particular, to a communication method and apparatus, a storage medium, and a computer program.

BACKGROUND

More types of control information are introduced with development of a wireless access standard. However, for an existing high efficiency (HE)-type high throughput control field (hereinafter referred to as "HT control field"), a quantity of remaining control identifiers that are not used yet and that are used for identifying control information is limited. How to process the HE-type HT control field to provide more types of control information and to aggregate other types of control information is a problem that needs to be resolved in this application.

SUMMARY

This application provides a communication method and apparatus, a storage medium, and a computer program, to provide more types of control information and to aggregate other types of control information.

According to a first aspect, a communication method is provided. The method includes: A first station generates a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, m<26, and m is a positive integer. The first station sends the first frame to a second station. In this aspect, the first station may provide more types of control information, and may flexibly aggregate other types of control information.

Alternatively, the method includes: A first station generates a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, and a length of the first control information is variable. The first station sends the first frame to a second station.

With reference to the first aspect, in a possible implementation, the control identifier is a first value, and the first value is a value in 9 to 15. In this implementation, the control identifier is set to a value in 9 to 15, so that the first control information corresponding to the control identifier may include the extended control subfield.

With reference to the first aspect, in still another possible implementation, the extended control identifier includes 4 bits, and the extended control subfield includes 16 types of second control information; or the extended control identifier includes 5 bits, and the extended control subfield includes 32 types of second control information; or the extended control identifier includes 6 bits, and the extended control subfield includes 64 types of second control information.

With reference to the first aspect, in still another possible implementation, when the control identifier is the first value, the first control subfield is the last control subfield in the aggregation control field. In this implementation, because the first control information includes an extended subfield list, and a length of the extended subfield list is variable. When the first control subfield is aggregated with other first control subfields, the first control subfield is located after all other first control subfields, and is the last control subfield of the aggregation control field, thereby effectively implementing aggregation of control fields.

According to a second aspect, a communication method is provided. The method includes: A first station generates a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, and m=26. The first station sends the first frame to a second station. In this aspect, the first station may provide more types of control information.

With reference to the first aspect or the second aspect, in still another possible implementation, the second station is an extremely high throughput (EHT) station, and when the extended control identifier is a second value, the extended control identifier indicates the second station to ignore a bit after the extended control identifier in the aggregation control field. When the first value is 15, it is specified that the control identifier is extended, and a meaning that a subsequent bit after the control identifier in the aggregation control field can be ignored is no longer included. In this implementation, when the extended control identifier is set to the second value, the extended control identifier indicates the second station to ignore the bit after the extended control identifier in the aggregation control field.

With reference to the first aspect or the second aspect, in still another possible implementation, the second station is a next generation station of an EHT, and when the extended control identifier is a second value, the extended control identifier indicates the second station to ignore a bit after the extended control identifier in the aggregation control field.

With reference to the first aspect or the second aspect, in still another possible implementation, the first control subfield is the 1st control subfield in the aggregation control field, and the extended control identifier is located at a beginning part of the second control information.

With reference to the first aspect or the second aspect, in still another possible implementation, the first control subfield is a unique control subfield in the aggregation control field, and the extended control identifier is located at a beginning part of the second control information.

With reference to the first aspect or the second aspect, in still another possible implementation, the second value is a value in 15, 31, or 63.

With reference to the first aspect or the second aspect, in still another possible implementation, the first control subfield further includes a padding subfield. If the extended control identifier is n bits, a value of the extended control identifier is 0, and the second control information is greater than 26−2*n bits, all bits of the padding subfield are 0; or all the bits of the padding subfield are 1. In the manner of setting the padding subfield in this implementation, ambiguity existing when the second station interprets the first frame can be avoided.

According to a third aspect, a communication method is provided. The method includes: A second station receives a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, m<26, and m is a positive integer. The second station obtains the second control information in the extended control subfield. In this aspect, when receiving the first frame, the second station obtains the first control subfield, and may interpret that the first control information of the first control subfield includes the extended control subfield, so as to obtain the second control information in the extended control subfield.

With reference to the third aspect, in a possible implementation, the first value is a value in 9 to 15.

With reference to the third aspect, in still another possible implementation, the extended control identifier includes 4 bits, and the extended control subfield includes 16 types of second control information; or the extended control identifier includes 5 bits, and the extended control subfield includes 32 types of second control information; or the extended control identifier includes 6 bits, and the extended control subfield includes 64 types of second control information.

With reference to the third aspect, in still another possible implementation, when the control identifier is the first value, the first control subfield is the last control subfield in the aggregation control field.

According to a fourth aspect, a communication method is provided. The method includes: A second station receives a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, and m=26. The second station obtains the second control information in the extended control subfield. In this aspect, more types of control information can be provided.

With reference to the third aspect or the fourth aspect, in still another possible implementation, the second station is an extremely high throughput EHT station, and when the extended control identifier is a second value, the extended control identifier indicates the second station to ignore a bit after the extended control identifier in the aggregation control field. The method further includes: The second station ignores the bit after the extended control identifier in the aggregation control field.

With reference to the third aspect or the fourth aspect, in still another possible implementation, the second station is a next generation station of an EHT, and when the extended control identifier is a second value, the extended control identifier indicates the second station to ignore a bit after the extended control identifier in the aggregation control field. The method further includes: The second station ignores the bit after the extended control identifier in the aggregation control field.

With reference to the third aspect or the fourth aspect, in still another possible implementation, the first control subfield is the 1st control subfield in the aggregation control field, and the extended control identifier is located at a beginning part of the second control information.

With reference to the third aspect or the fourth aspect, in still another possible implementation, the first control subfield is a unique control subfield in the aggregation control field, and the extended control identifier is located at a beginning part of the second control information.

With reference to the third aspect or the fourth aspect, in still another possible implementation, the second value is a value in 15, 31, or 63.

With reference to the third aspect or the fourth aspect, in still another possible implementation, the first control subfield further includes a padding subfield. If the extended control identifier is n bits, a value of the extended control identifier is 0, and the second control information is greater than 26−2*n bits, all bits of the padding subfield are 0; or all the bits of the padding subfield are 1.

According to a fifth aspect, a communication apparatus is provided. The communication apparatus includes a transceiver unit and a processing unit. The processing unit is configured to generate a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, m<26, and m is a positive integer. The transceiver unit is configured to send the first frame to a second station.

According to a sixth aspect, a communication apparatus is provided. The communication apparatus includes a processing unit and a transceiver unit. The processing unit is configured to generate a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, and m=26. The transceiver unit is configured to send the first frame to a second station.

According to a seventh aspect, a communication apparatus is provided. The communication apparatus includes a transceiver unit and a processing unit. The transceiver unit is configured to receive a first frame. The first frame includes an aggregation control field, the aggregation control field includes a first control subfield, the first control subfield includes a control identifier and first control information corresponding to the control identifier, the first control information includes an extended control subfield, the extended control subfield includes an extended control identifier and second control information corresponding to the extended control identifier, the first control information is m bits, m<26, and m is a positive integer. The processing unit is configured to obtain the second control information in the extended control subfield.

According to an eighth aspect, a communication apparatus is provided. The communication apparatus includes a processing unit and a transceiver unit. The transceiver unit is configured to receive a first frame. The first frame includes an aggregation control field, the aggregation control field includes a first control subfield, the first control subfield includes a control identifier and first control information corresponding to the control identifier, and the first control information includes an extended control subfield; and, the extended control subfield includes an extended control identifier and second control information corresponding to the extended control identifier, the first control information is m bits, and m=26. The processing unit is configured to obtain the second control information in the extended control subfield.

With reference to the seventh aspect or the eighth aspect, in one embodiment, the second station is an extremely high throughput EHT station, and when the extended control identifier is a second value, the extended control identifier indicates the second station to ignore a bit after the extended control identifier in the aggregation control field. The processing unit is further configured to ignore the bit after the extended control identifier in the aggregation control field.

In one embodiment, when the second station is a next generation station of an EHT, and the extended control identifier is a second value, the extended control identifier indicates the second station to ignore a bit after the extended control identifier in the aggregation control field. The processing unit is further configured to ignore the bit after the extended control identifier in the aggregation control field.

According to a ninth aspect, a computer-readable storage medium is provided. The computer-readable storage medium stores instructions. When the instructions are run on a computer, the computer is enabled to perform the communication method provided in any one of the implementations according to the first aspect to the fourth aspect.

According to a tenth aspect, a computer program product including instructions is provided. When the computer program product is run on a computer, the computer is enabled to perform the communication method provided in any one of the implementations according to the first aspect to the fourth aspect.

It may be understood that any communication apparatus, computer storage medium, or computer program product provided above is configured to perform the corresponding method provided above. Therefore, for beneficial effects that can be achieved by the communication apparatus, computer storage medium, or computer program product, refer to beneficial effects in the corresponding method provided above. Details are not described herein again.

BRIEF DESCRIPTION OF DRAWINGS

FIG. 3 is a schematic diagram of a format of a high throughput control field according to an embodiment of this application;

FIG. 4 is a schematic diagram of a format of an aggregation control field according to an embodiment of this application;

FIG. 5 is a schematic diagram of a format of a control subfield in an aggregation control field according to an embodiment of this application;

FIG. 6 is a schematic diagram of a type of extended control information according to an embodiment of this application;

DESCRIPTION OF EMBODIMENTS

The following describes embodiments of this application with reference to the accompanying drawings in embodiments of this application.

It should be understood that, embodiments of this application may be applied to various communication systems, for example, a global system for mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G communication system, and a future 6G communication system.

It should be further understood that embodiments of this application may be further applied to various non-orthogonal multiple access technology-based communication systems, for example, a sparse code multiple access (SCMA) system. Certainly, SCMA may also be referred to as another name in the communication field. Further, the technical solutions in embodiments of this application may be applied to a multi-carrier transmission system using the non-orthogonal multiple access technology, for example, an orthogonal frequency division multiplexing (OFDM) system using the non-orthogonal multiple access technology, a filter bank multi-carrier (FBMC) system, a generalized frequency division multiplexing (GFDM) system, and a filtered-orthogonal frequency division multiplexing (filtered-OFDM, F-OFDM) system.

It should be further understood that embodiments of this application may be applied to an LTE system, a 5G system, and a subsequent evolved system such as 6G, or another wireless communication system using various wireless access technologies, for example, a system using an access technology such as code division multiple access, frequency division multiple access, time division multiple access, orthogonal frequency division multiple access, or single carrier frequency division multiple access, and are particularly applicable to a scenario in which a channel information feedback and/or a two-level precoding technology is required, for example, a wireless network in which a massive multiple-input multiple-output (Massive MIMO) technology is applied, and a wireless network in which a distributed antenna technology is applied.

Figure 1:
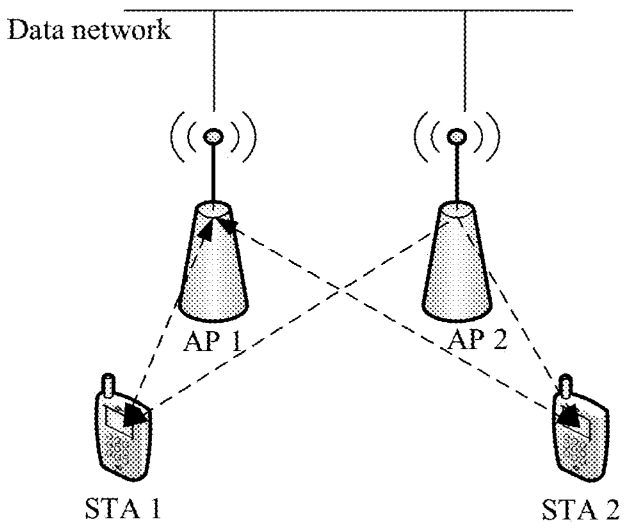
FIG. 1 is a schematic diagram of a structure of a communication system according to this application.

It should be further understood that embodiments of this application may be applied to Wi-Fi wireless communication. A Wi-Fi wireless communication system includes an access point (AP) and a station (STA). The station may also be referred to as a station or a non-access point (non-AP) station. Related wireless communication scenarios may include communication between an AP and a STA, communication between APs, communication between STAs, and the like. In embodiments of this application, communication between an AP and a STA is used as an example for description. As shown in FIG. 1, an AP 1 may perform wireless communication with a STA 1 and a STA 2, and an AP 2 may also perform wireless communication with the STA 1 and the STA 2. For example, the AP and the STA associated with the AP may perform uplink and downlink communication according to the IEEE802.11 protocol, or certainly may perform communication according to another protocol. This is not limited in this application. The AP 1 and the AP 2 may access a data network in a wired or wireless manner. It should be understood that the method described in embodiments of this application is also applicable to communication between APs, communication between STAs, and the like.

A structure of each of the AP and the STA in embodiments of this application may include a media access control (MAC) layer and a physical (PHY) layer. The AP and the STA may perform PPDU transmission by using a physical layer protocol data unit (PHY Protocol Data Unit, PPDU). In addition, a frame structure of the PPDU varies with a wireless communication protocol used by the AP and the STA.

In a communication process, a first station may report control information to a second station, and the control information is carried in an HT control field. The first station may be an AP station or a non-AP station, and the second station may also be an AP station or a non-AP station. The reporting can be unsolicited reporting or solicited reporting.

Figure 2:
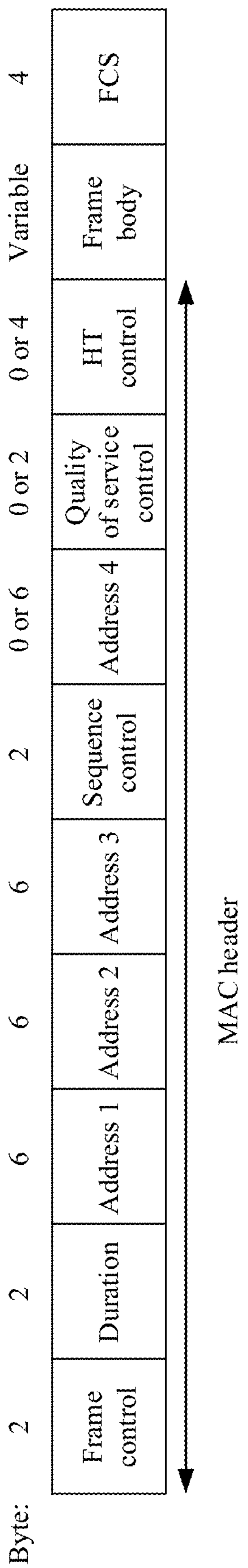
FIG. 2 is a schematic diagram of a format of a high throughput control field carried in a quality of service data frame according to an embodiment of this application.

The HT control field may be carried in a first frame (for example, a quality of service (QoS) data frame, a quality of service null (QoS Null) frame, and a management frame), and is used to carry some control information. FIG. 2 is a schematic diagram of a format of a high throughput control field carried in a quality of service data frame according to an embodiment of this application. The QoS data frame includes an HT control field, and indicates, by using a frame control field, whether the HT control field exists. A length of the HT control field is 4 bytes. There are three types of HT control fields, which are distinguished by bits B0 and B1. FIG. 3 is a schematic diagram of a format of a high throughput control field according to an embodiment of this application. When B0=0, a corresponding HT control field is a high throughput (HT)-type HT control field; when B0=1 and B1=0, a corresponding HT control field is a very high throughput (VHT)-type HT control field; or when B0=1 and B1=1, a corresponding HT control field is a high efficiency (HE)-type HT control field.

Herein, B2-B31 parts in the HE-type HT control field are referred to as an aggregation control (A-control) field (subfield). FIG. 4 is a schematic diagram of a format of an aggregation control field according to an embodiment of this application. The aggregation control field includes a control list and a padding part. A length of the control list is variable, and the control list includes one or more control subfields. The padding part includes 0 or more bits. FIG. 5 is a schematic diagram of a format of a control subfield in an aggregation control field according to an embodiment of this application. The control subfield includes a 4-bit control identifier and control information. The control identifier identifies control information. The control identifier and a length of control information corresponding to the control identifier are shown in the following Table 1.

TABLE 1

| Value of a control identifier | Meaning | Length of control information (bit) | Content of the control information |
|---|---|---|---|
| 0 | Triggered response scheduling (TRS) | 26 | See 9.2.4.6a.1 (TRS control) |
| 1 | Operating mode (OM) | 12 | See 9.2.4.6a.2 (OM control) |
| 2 | High efficiency link adaptation (HE link adaptation, HLA) | 26 | See 9.2.4.6a.3 (HLA control) |
| 3 | Buffer status report (BSR) | 26 | See 9.2.4.6a.4 (BSR control) |
| 4 | Uplink power headroom (UL power headroom, UPH) | 8 | See 9.2.4.6a.5 (UPH control) |
| 5 | Bandwidth query report (BQR) | 10 | See 9.2.4.6a.6 (BQR control) |
| 6 | Command and status (CAS) | 8 | See 9.2.4.6a.7 (CAS control) |
| 7 | Extremely high throughput operating mode (EHT operating mode, EHT OM) | 6 | See 9.2.4.6a.8 (EHT OM control) |
| 8 | Single response scheduling (SRS) | 10 | See 9.2.4.6a.9 (SRS control) |
| 10 | Access point assistance request (AP assistance request, AAR) | 20 | See 9.2.4.6a.10 (AAR control) |
| 9, 11-14 | Reserved | | |
| 15 | Ones need expansion surely (ONES) | 26 | Set to all 1s |

In Table 1, a 4-bit control identifier may identify 16 types of control information. The control identifiers 0 to 6 respectively identify seven types of HEs and control information before the HEs; the control identifiers 7, 8, and 10 respectively identify control information of three types of EHTs; and the control identifiers 9 and 11 to 14 are reserved (in another description, the control identifiers 7 to 9 respectively identify control information of three types of EHTs, and 10 to 14 are reserved). The control identifier is 15, and indicates to ignore a bit after the control identifier in the aggregation control field. Control information corresponding to the control identifier occupies 26 bits, in other words, the control information corresponding to the control identifier in the aggregation control field is ignored. The control identifier is 15 (that is, "1111"), and control information corresponding to the control identifier is also set to all Is.

Currently, some types of control information have been added to the IEEE802.11be, but only five types of control identifiers are not used yet in Table 1. More types of control information may be introduced in a subsequent 11be standard. In this case, it is important to extend a current type of control information, to meet a requirement that more types of control information need to be introduced in 11be and a next generation standard.

Figures 7, 8, 9:
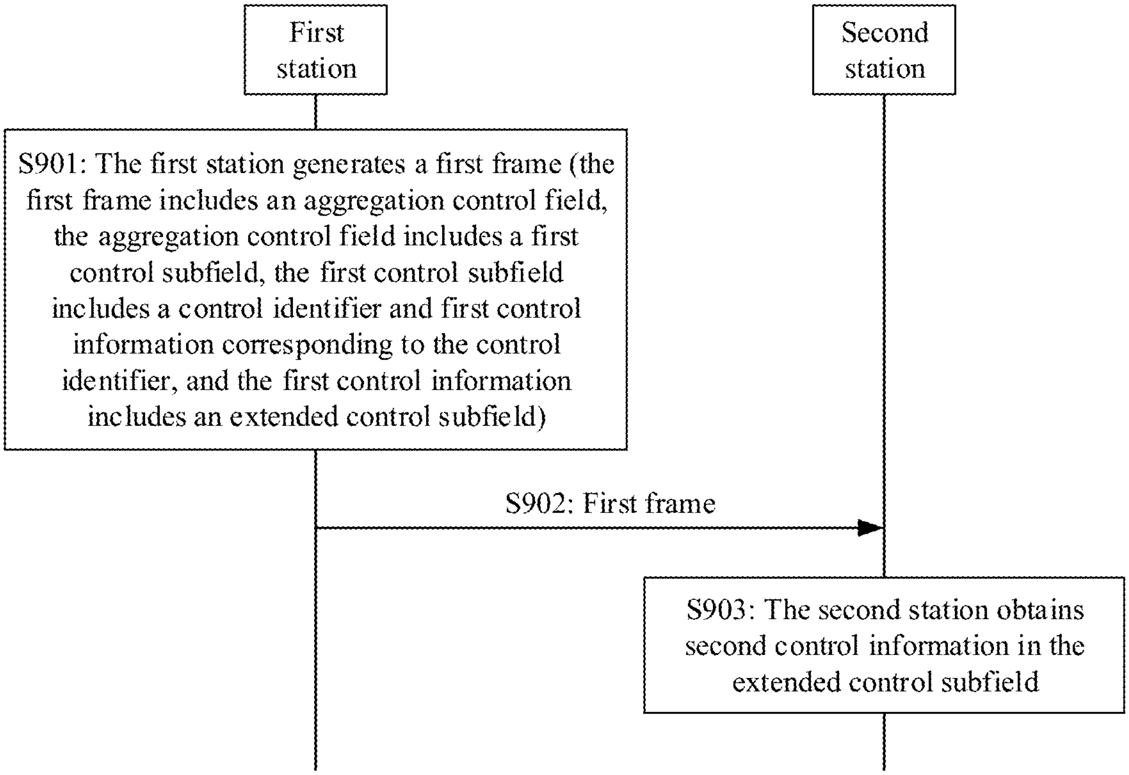
FIG. 7 is a schematic diagram of a format of extended control information according to an embodiment of this application.
FIG. 8 is a schematic diagram of a format of an extended control subfield in an extended control list according to an embodiment of this application.
FIG. 9 is a schematic flowchart of a communication method according to an embodiment of this application.

In an embodiment of this application, FIG. 6 is a schematic diagram of a type of extended control information according to an embodiment of this application. The control information ("first control information") corresponding to the control identifier 15 in Table 1 may be changed to indicate that the first control information includes an extended control subfield, the first control information is m bits, and m=26. The foregoing rule is mainly for a receiving station of the first frame, that is, the second station, which is an EHT station or a next generation station of an EHT. That is, when the first frame is sent to an HE station, the previous rule remains unchanged, that is, the control identifier indicates that bit after the control identifier may be ignored. When the first frame is sent to the EHT station or the next generation station of the EHT, it indicates that the first frame is an extension of the control identifier. A format of the first control information corresponding to the control identifier is shown in FIG. 7. The first control information includes an extended control list and a padding part. The extended control list includes one or more extended control subfields, and the padding part includes 0 or more bits. If the padding part exists, the padding part is located after the last extended control subfield, so that a length of the first control information is 26 bits. When the second station is the EHT station or the next generation station of the EHT, if the second station obtains, through parsing, that the control identifier is 15, control information in the extended control subfield is obtained.

FIG. 8 is a schematic diagram of a format of an extended control subfield in an extended control list according to an embodiment of this application. The extended control subfield includes an extended control identifier (Extended Control ID) and control information ("second control information"). The extended control identifier is of a length, for example, may be one of 4 to 6 bits, and a length of the second control information is variable. The extended control identifier identifies a type of the second control information. For example, the first control information and the second control information are only used for distinguishing. The first control information is control information corresponding to a control identifier in Table 1, and the second control information is control information corresponding to an extended control identifier. Both the first control information and the second control information are control functions used for different purposes, and control information types of the first control information and the second control information are different.

The following embodiment further provides a method for extending a type of control information. In the method, a first station may provide more types of control information, and a length of first control information is variable, so that other types of control information can be flexibly aggregated. When receiving a first frame, a second station obtains a first control subfield, and may interpret that the first control information of the first control subfield includes an extended control subfield, to obtain second control information in the extended control subfield.

FIG. 9 is a schematic flowchart of a communication method according to an embodiment of this application. The method includes the following operations.

S901: A first station generates a first frame.

The first station may be an AP station or a non-AP station. The first frame may be the QoS data frame, the QoS null frame, the management frame, or the like.

Figure 10:
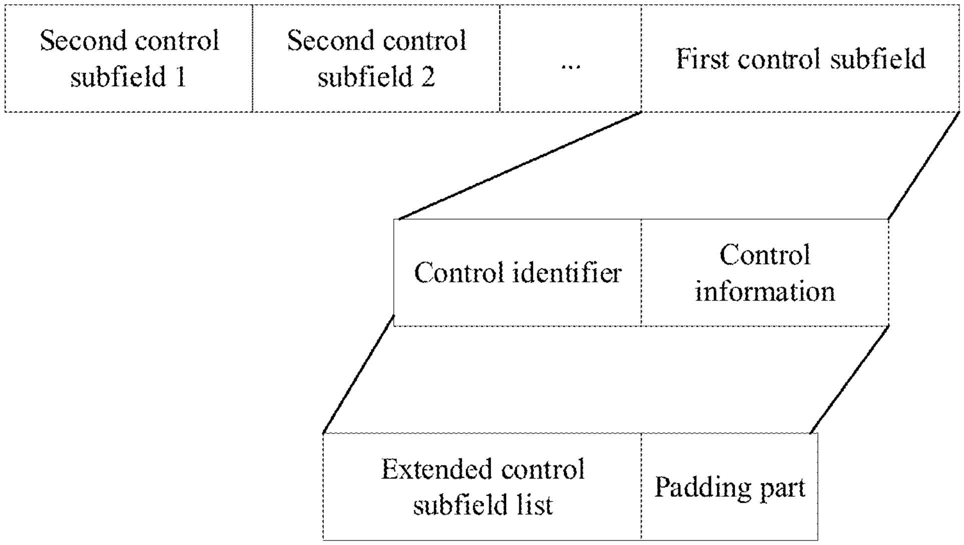
FIG. 10 is a schematic diagram of a format of another aggregation control field according to an embodiment of this application.
Figure 11:
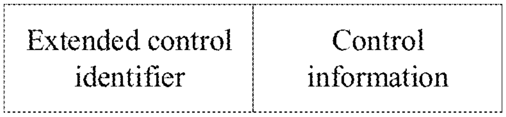
FIG. 11 is a schematic diagram of a format of an extended control subfield according to an embodiment of this application.

The first frame includes an HT control field. When B0=1 and B1=1 in the HT control field, B2-B31 in the HT control field are referred to as an aggregation control field. FIG. 10 is a schematic diagram of a format of another aggregation control field according to an embodiment of this application. The aggregation control field includes a first control subfield. The first control subfield includes a control identifier and control information ("first control information") corresponding to the control identifier. The first control information includes an extended control subfield list and a padding part. The extended control subfield list includes one or more extended control subfields. FIG. 11 is a schematic diagram of a format of an extended control subfield according to an embodiment of this application. The extended control subfield includes an extended control identifier (Extended Control ID) and control information ("second control information") corresponding to the extended control identifier. The extended control identifier identifies a type of the second control information.

For example, when the control identifier in the first control subfield is a first value, the control identifier indicates that the first control information corresponding to the control identifier includes the extended control subfield list and the padding part. For example, the first value may be a value in 9 to 15. Any value can be selected from 9 to 15, or a fixed value can be selected from 9 to 15. Herein, 9 to 14, or 9 and 11 to 14 are control identifiers that are not used currently (that is, the control identifiers reserved in Table 1).

For example, the first control information and the second control information are only used for distinguishing. The first control information is control information corresponding to a control identifier other than the first value in Table 1, and the second control information is control information corresponding to an extended control identifier. Both the first control information and the second control information are control functions used for different purposes, and control information types of the first control information and the second control information are different.

Therefore, for a case in which the remaining control identifiers in Table 1 are insufficient, in this embodiment, more types of control information may be obtained through extension by using the first control subfield and the extended control identifier field. In the following embodiment, the solution of this embodiment is described by using Control ID=15 as an example. When the first value is another unused control identifier, there is a slight difference, which is described in the following.

The extended control identifier is a newly added field, and may include 4 to 6 bits. When the extended control identifier is 4, 5, or 6 bits, there may be up to 16, 32, or 64 types of control information obtained through extension. In the following embodiment, an example in which the extended control identifier is 4 bits is used for description. In actual implementation, another length may alternatively be used.

In this embodiment, Control ID=15 as an example. A control identifier, an extended control identifier, and a length of control information corresponding to the extended control identifier are shown in Table 2 below.

TABLE 2

| Value of the control identifier | Value of the extended control identifier | Meaning | Length of control information (bit) |
|---|---|---|---|
| 0 | Default | Triggered response scheduling (TRS) | 26 |
| 1 | Default | Operating mode (OM) | 12 |
| 2 | Default | High efficiency link adaptation (HE link adaptation, HLA) | 26 |
| 3 | Default | Buffer status report (BSR) | 26 |
| 4 | Default | Uplink power headroom (UL power headroom, UPH) | 8 |
| 5 | Default | Bandwidth query report (BQR) | 10 |
| 6 | Default | Command and status (CAS) | 8 |
| 7 | Default | Extremely high throughput operating mode (EHT operating mode, EHT OM) | 6 |
| 8 | Default | Single response scheduling (SRS) | 10 |
| 10 | Default | Access point assistance request (AP assistance request, AAR) | 20 |
| 9, 11-14 | Default | Reserved | |
| 15 | | Indicate to include the extended control identifier | Variable |
| 15 | 0-14 | Reserved | |
| 15 | 15 | For an EHT station or a next generation station of an EHT, the value indicates to ignore a bit after the extended control identifier | 22 |

In Table 2, the extended control identifier is 4 bits, so that 16 types of second control information can be extended. A length of the second control information is determined by the extended control identifier.

In this embodiment, a length of the first control information in FIG. 10 is variable. In this embodiment, in a schematic diagram of a format of an extended control subfield shown in FIG. 11, because the first control information includes the extended control subfield, and the first control information is m bits, m<26, and m is a positive integer. Further, assuming that an extended control identifier in the extended control subfield is n bits, and n≤m<26. Alternatively, assuming that the extended control identifier in the extended control subfield is n bits, the first control information includes x extended control subfields, and a length of the extended control subfield is $l_x$, $x*(n+l_x)<26$, where n and x are positive integers, and x=1, 2, . . . . Because the length of the first control information in the second control subfield is variable, as shown in FIG. 10, in addition to the first control subfield, the aggregation control field may further aggregate one or more second control subfields (as shown in FIG. 10, the aggregation control field further includes a second control subfield 1, a second control subfield 2, and the like). A difference between the first control subfield and the second control subfield lies in that control information subfield in the first control subfield includes an extended control subfield list and a padding part. Control information subfield of the second control subfield includes control information of a fixed length.

For example, because the first control information of the first control subfield includes the extended control subfield list, and a length of the extended control subfield list is variable, as shown in FIG. 10, when the first control subfield is aggregated with one or more second control subfields, the first control subfield is located after all second control subfields in the aggregation control field, and is the last control subfield of the aggregation control field. In other words, if there is another control subfield after the first control subfield, it is infeasible. Because the first control subfield has a variable length, a second station cannot determine where the first control subfield ends, and therefore cannot correctly interpret the aggregation control field.

In addition, Control ID=15 is specified as extension of the control identifier, and no longer includes a meaning that a subsequent bit after the control identifier in the aggregation control field that can be ignored. Therefore, an extended control identifier needs to indicate that the second station (the EHT station or the next generation station of the EHT) may ignore a subsequent bit after the extended control identifier subfield in the aggregation control field. In this embodiment, when the extended control identifier is a second value, the second value indicates that the second station may ignore the subsequent bit after the extended control identifier subfield in the aggregation control field. The subsequent bit may include some or all bits after the extended control identifier subfield in the aggregation control field.

For example, as shown in Table 2, the extended control identifier may be all is to indicate that the second station may ignore the subsequent bit after the extended control identifier subfield in the aggregation control field. In this way, all subsequent bits after the extended control identifier subfield in the aggregation control field may also be set to all 1 s. A used sequence in a such way is the same as a bit used by an HE station (an all-1 sequence), which is convenient for implementation. Certainly, subsequent bits after the extended control identifier subfield in the aggregation control field may also be set to other sequences except all Is. When the extended control identifier is 4 bits, correspondingly, Extended Control ID=15 indicates that the second station can ignore a subsequent bit after the extended control identifier subfield in the aggregation control field. When the extended control identifier is 5 bits, correspondingly, Extended Control ID=31 indicates that the second station can ignore a subsequent bit after the extended control identifier subfield in the aggregation control field. When the extended control identifier is 6 bits, correspondingly, Extended Control ID=63 indicates that the second station may ignore a subsequent bit after the extended control identifier subfield in the aggregation control field. Certainly, the second value may alternatively be another value to indicate that the second station may ignore a subsequent bit after the extended control identifier subfield in the aggregation control field. This is not limited in this application.

Only when no second control subfield or extended control subfield in the aggregation control field needs to be carried, the second station is indicated to ignore a subsequent bit after the extended control identifier subfield in the aggregation control field. Therefore, when Extended Control ID=15 indicates that the second station can ignore a subsequent bit after the extended control identifier subfield in the aggregation control field, in an implementation, the first control subfield may be the 1st control subfield in the aggregation control field, and the extended control identifier is located at a beginning part of the second control information. In another implementation, the first control subfield may be a unique control subfield in the aggregation control field, and the extended control identifier is located at a beginning part of the second control information.

In the foregoing, extension of a control information type is mainly indicated by using Control ID=15. In addition, another reserved control identifier (for example, Control ID=14) may also indicate the extension of the control information type. Using Control ID=15 is equivalent to reusing Control ID=15 in Table 1, that is, saving a control identifier. However, an extended control identifier needs to indicate that the second station may ignore a subsequent bit after the extended control identifier subfield in the aggregation control field. That is, the second station needs to combine the Control ID=15 and the extended control identifier to learn that the subsequent bit can be ignored. However, if another reserved control identifier (for example, Control ID=14) indicates the extension of the control information type, the second station may determine, in a same manner as the HE station, that a subsequent bit after the extended control identifier subfield in the aggregation control field may be ignored, that is, it may be determined, by reading Control ID=15, that the subsequent bit after the extended control identifier subfield in the aggregation control field may be ignored.

In addition, when the extended control subfield list in the first control subfield does not use up a remaining bit in the aggregation control field, some bits need to be padded, so that a length of the aggregation control field is 30 bits. In this embodiment, a padding part is located after the extended control subfield list, or in other words, is located after the second control information in the last extended control subfield.

Figure 12:
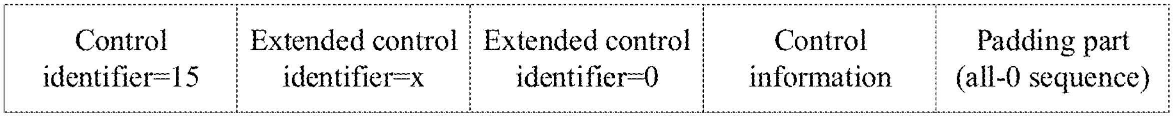
FIG. 12 is a schematic diagram of a format of a first control subfield of a second station interpretation according to an embodiment of this application.
Figure 13:
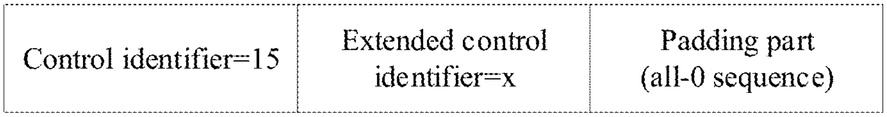
FIG. 13 is a schematic diagram of a format of another first control subfield of a second station interpretation according to an embodiment of this application.

In an implementation, the padding part is set to an all-0 sequence, which is convenient for implementation. However, whether the padding part may be set by using the all-0 sequence depends on a length of second control information corresponding to Extended Control ID=0. FIG. 12 and FIG. 13 are schematic diagrams of formats of two first control subfields interpreted by the second station according to this embodiment of this application. If the first control subfield carries an extended control subfield x, and second control information corresponding to Extended Control ID=x is null, the second station cannot distinguish which one of FIG. 12 and FIG. 13 the first control subfield belongs to, and there is ambiguity of interpretation. It is assumed that the extended control identifier is n bits, and a length of second control information subfield corresponding to Extended Control ID=0 is m bits. Because the second control information corresponding to Extended Control ID=x may be 0 bits, a minimum length of the extended control subfield x is n. When $n+n+m<=26$, there is the preceding interpretation ambiguity. To eliminate the preceding interpretation ambiguity, $2*n+m>26$ is set, that is, $m>26-2*n$. If $n=4$, $m>18$. If $n=5$, $m>16$. If $n=6$, $m>14$.

Therefore, when the length of the second control information subfield corresponding to Extended Control ID=0 is greater than 18, the padding part may be set by using all 0 s.

In another implementation, the padding part may alternatively be set by using an all-1 sequence. In this way, this is also corresponding to the fact that the extended control identifier is all is indicates that the subsequent bit after the extended control identifier subfield in the aggregation control field may be ignored.

The foregoing design of the padding part is described based on the structure shown in FIG. 7. In one embodiment, the padding part is a part of the control information in the first control subfield. However, in another understanding manner, when the first control subfield appears in the aggregation control field, if padding needs to be performed at the end of the aggregation control field, the padding part does not belong to a part of the first control subfield, that is, the padding part is no longer included in FIG. 7. It should be understood that this is only a change in description, and does not change a design of a padding sequence and a function of the padding sequence. If the padding part in the solution of this application is an all-1 sequence or y 1 s plus any bit, it means that the padding part of the aggregation control field has two setting manners. If the aggregation control field does not include the first control subfield, the padding part is an all-0 sequence; or if the aggregation control field includes the first control subfield, the padding part is an all-1 sequence or y is plus any bit. Herein, y is a positive integer.

S902: The first station sends the first frame to the second station.

The second station may also be an AP station or a non-AP station. The second station receives the first frame.

S903: After receiving the first frame, the second station obtains second control information in an extended control subfield.

After receiving the first frame, the second station parses the first frame. The first frame includes the aggregation control field, and the aggregation control field includes the first control subfield. When the second station obtains the first control subfield, the second station further parses the extended control identifier in the extended control subfield, to determine a type of second control information corresponding to the extended control identifier, so as to obtain more types of control information.

Further, when the second station obtains, through parsing, that the control identifier in the first control subfield is the first value, the second station may identify that the first control information in the first control subfield includes the extended control subfield list. Therefore, the second station further parses the extended control identifier in the extended control subfield, to determine the type of the second control information corresponding to the extended control identifier, so as to obtain more types of control information.

For example, the second station may be the EHT station. When the EHT station parses that one extended control identifier is the second value, the EHT station ignores a bit after the extended control identifier in the aggregation control field. The second value may be a value in 15, 31, or 63. The first control subfield is the 1st control subfield in the aggregation control field, and the extended control identifier is located at the beginning part of the second control information; or the first control subfield is a unique control subfield in the aggregation control field, and the extended control identifier is located at the beginning part of the second control information.

For example, the second station may be the next generation station of the EHT. When the next generation station of the EHT parses that one extended control identifier is the second value, the next generation station of the EHT ignores a bit after the extended control identifier in the aggregation control field. The second value may be a value in 15, 31, or 63. The first control subfield is the 1st control subfield in the aggregation control field, and the extended control identifier is located at the beginning part of the second control information; or the first control subfield is a unique control subfield in the aggregation control field, and the extended control identifier is located at the beginning part of the second control information.

According to the communication method provided in this embodiment of this application, in the method, the first station may provide more types of control information, and a length of the first control information is variable, so that another type of control information can be flexibly aggregated. When receiving the first frame, the second station obtains the first control subfield, and may interpret that the first control information of the first control subfield includes the extended control subfield, to obtain the second control information in the extended control subfield.

The foregoing describes the solutions provided in embodiments of this application. It may be understood that, to implement the foregoing functions, a communication apparatus (for example, the first station or the second station) includes corresponding hardware structures and/or software modules for performing the functions. A person skilled in the art should be easily aware that, with reference to units and algorithm operations in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method examples. For example, each functional module may be obtained through division based on each function, or two or more functions may be integrated into one processing module. The functional module may be implemented in a form of hardware, or may be implemented in a form of a software functional module. It should be noted that, in embodiments of this application, module division is an example, and is merely a logical function division. In actual implementation, another division manner may be used. The following uses division of each functional module based on a corresponding function as an example for description.

Figure 14:
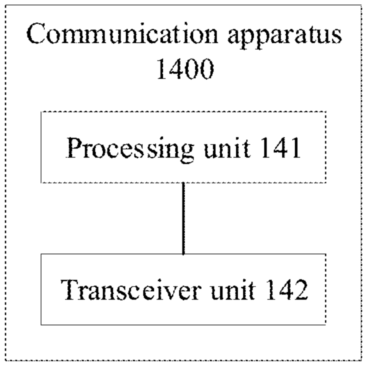
FIG. 14 is a schematic diagram of a structure of a communication apparatus according to an embodiment of this application.

The communication apparatus may be the foregoing first station. A possible schematic diagram of a structure of the communication apparatus is shown in FIG. 14. The communication apparatus 1400 includes a processing unit 141 and a transceiver unit 142. The processing unit 141 is configured to perform operation S901 in the foregoing embodiment. The transceiver unit 142 is configured to perform the sending operation in operation S902 in the foregoing embodiment.

Figure 15:
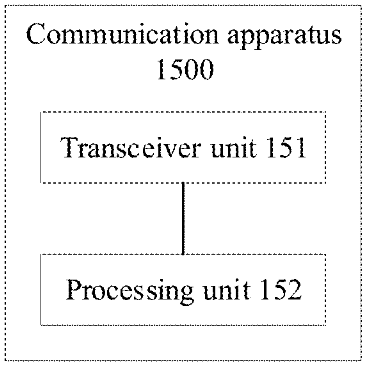
FIG. 15 is a schematic diagram of a structure of another communication apparatus according to an embodiment of this application.

The communication apparatus may be the foregoing second station. A possible schematic diagram of a structure of the communication apparatus is shown in FIG. 15. The communication apparatus 1500 includes a transceiver unit 151 and a processing unit 152. The transceiver unit 151 is configured to perform the receiving operation in operation S902 in the foregoing embodiment. The processing unit 152 is configured to perform operation S903 in the foregoing embodiment.

All related content of each operation involved in the foregoing method embodiment may be cited in a function description of a corresponding functional module. Details are not described herein again.

Figure 16:
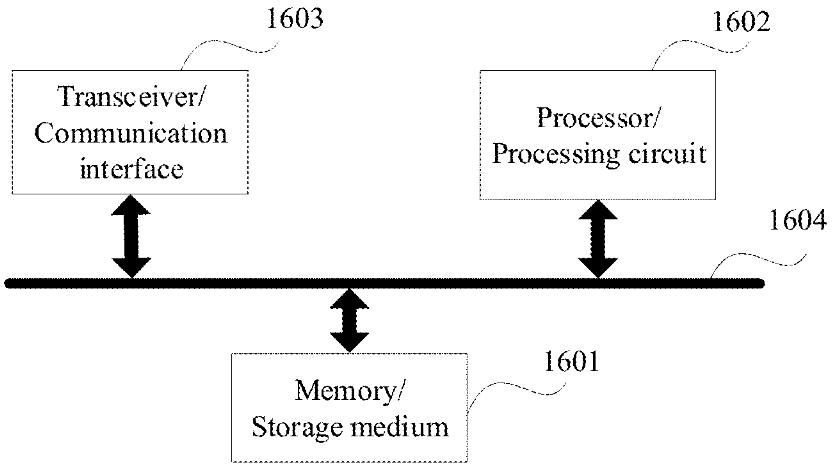
FIG. 16 is a schematic diagram of a structure of another communication apparatus according to an embodiment of this application.

FIG. 16 is a diagram of a structure of a possible product form of a communication apparatus according to an embodiment of this application.

In a possible product form, the communication apparatus includes a processor 1602 and a transceiver 1603. The processor 1602 is configured to perform operation S901 in the foregoing embodiment. The transceiver 1603 is configured to perform the sending operation in operation S902 in the foregoing embodiment.

In one embodiment, the communication apparatus may further include a memory 1601.

In another possible product form, the communication apparatus is alternatively implemented by a general-purpose processor, namely, a chip. The general-purpose processor includes: a processing circuit 1602 and a communication interface 1603. In one embodiment, the general-purpose processor may further include a storage medium 1601.

The processing circuit 1602 is configured to perform operation S901 in the foregoing embodiment. The communication interface 1603 is configured to perform the sending operation in operation S902 in the foregoing embodiment.

In another possible product form, the communication apparatus may alternatively be implemented by using the following: one or more field programmable gate arrays (FPGAs), a programmable logic device (PLD), a controller, a state machine, gate logic, a discrete hardware component, any other suitable circuit, or any combination of circuits that can perform various functions described in this application.

The processor 1602 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. A bus 1604 may be a peripheral component interconnect (PCI) bus, an extended industry standard architecture (EISA) bus, or the like. The bus may include an address bus, a data bus, a control bus, and the like. For ease of description, the bus in FIG. 16 is represented by only one thick line, but this does not indicate that there is only one bus or one type of bus.

Figure 17:
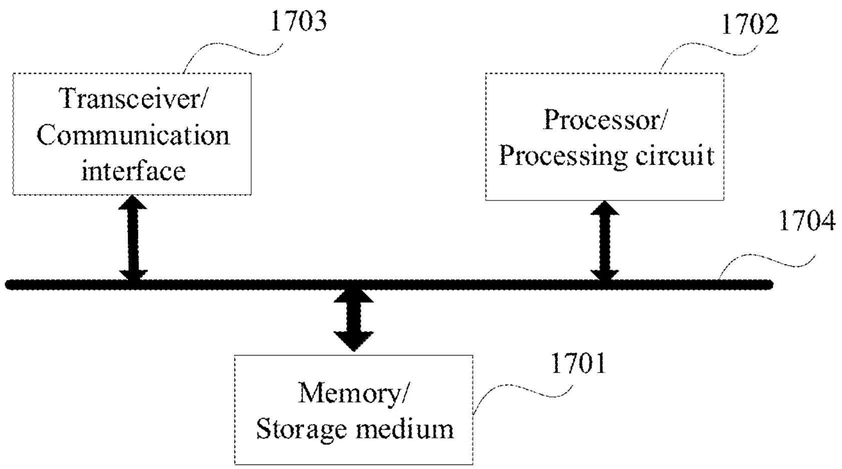
FIG. 17 is a schematic diagram of a structure of another communication apparatus according to an embodiment of this application.

FIG. 17 is a diagram of a structure of a possible product form of a communication apparatus according to an embodiment of this application.

In a possible product form, the communication apparatus includes a processor 1702 and a transceiver 1703.

The processor 1702 is configured to perform operation S903 in the foregoing embodiment. The transceiver 1703 is configured to perform the receiving operation in operation S902 in the foregoing embodiment.

In one embodiment, the communication apparatus may further include a memory 1701.

In another possible product form, the communication apparatus is alternatively implemented by a general-purpose processor, namely, a chip. The general-purpose processor includes: a processing circuit 1702 and a communication interface 1703. In one embodiment, the general-purpose processor may further include a storage medium 1701.

The processing circuit 1702 is configured to perform operation S903 in the foregoing embodiment.

The communication interface 1703 is configured to perform the receiving operation in operation S902 in the foregoing embodiment.

In another possible product form, the communication apparatus may alternatively be implemented by using the following: one or more FPGAs, a PLD, a controller, a state machine, gate logic, a discrete hardware component, any other proper circuit, or any combination of circuits that can perform various functions described in this application.

The processor 1702 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The bus 1704 may be a PCI bus, an EISA bus, or the like. The bus may include an address bus, a data bus, a control bus, and the like. For ease of description, the bus in FIG. 17 is represented by only one thick line, but this does not indicate that there is only one bus or one type of bus.

A person of ordinary skill in the art may understand that all or some of the operations of the method embodiments may be implemented by hardware related to program instructions. The program instructions may be stored in a computer-readable storage medium. When the program instructions are run, the operations of the method embodiments are performed. The foregoing storage medium includes any medium that can store program code, such as a USB flash drive, a removable hard disk, a ROM, a RAM, a magnetic disk, or an optical disc.

In one aspect, an embodiment of this application further provides a readable storage medium. The readable storage medium stores computer-executable instructions, and when the computer-executable instructions are run, a device (which may be a single-chip microcomputer, a chip, a controller, or the like) or a processor is enabled to perform operations in a communication method provided in this application.

In one aspect, an embodiment of this application further provides a computer program product. The computer program product includes computer-executable instructions, and the computer-executable instructions are stored in a computer-readable storage medium, a processor of a device may read the computer-executable instructions from the computer-readable storage medium, and the processor executes the computer-executable instructions, so that the device performs operations in a communication method provided in this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, division into the units is merely logical function division and may be other division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

All or some of the foregoing embodiments may be implemented by software, hardware, firmware, or any combination thereof. When software is used for implementation, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a read-only memory (ROM); a random access memory (RAM); or a magnetic medium, for example, a floppy disk, a hard disk, a magnetic tape, or a magnetic disk; an optical medium, for example, a digital versatile disc (DVD); a semiconductor medium, for example, a solid state disk (SSD); or the like.

What is claimed is:

1. An apparatus comprising:

at least one processor; and at least one memory, coupled to the at least one processor, and storing programming instructions for execution by the at least one processor and causing the apparatus to:

generate a first frame, wherein the first frame comprises an aggregation control field, the aggregation control field comprises a first control subfield, the first control subfield comprises a control identifier and first control information corresponding to the control identifier, the first control information comprises an extended control subfield, the extended control subfield comprises an extended control identifier and second control information corresponding to the extended control identifier, the first control information is m bits, $m<26$, m is a positive integer, the control identifier is a first value, and the first value is a value from 9 to 15, and when the control identifier is the first value, the first control subfield is a last control subfield in the aggregation control field; and send the first frame to a second station.

2. The apparatus according to claim 1, wherein the second station is an extremely high throughput (EHT) station or a next generation station of an EHT; and when the extended control identifier is a second value, the extended control identifier indicates the second station to ignore a bit after the extended control identifier in the aggregation control field.

3. The apparatus according to claim 2, wherein the first control subfield is a 1st control subfield in the aggregation control field or a unique control subfield in the aggregation control field, and the extended control identifier is located at a beginning part of the second control information.

4. The apparatus according to claim 2, wherein the second value is a value of 15, 31, or 63.

5. The apparatus according to claim 1, wherein the first control subfield further comprises a padding subfield; and if the extended control identifier is n bits, a value of the extended control identifier is 0, and the second control information is greater than 26-2*n bits, all bits of the padding subfield are 0; or all the bits of the padding subfield are 1.

6. An apparatus comprising:

at least one processor; and at least one memory, coupled to the at least one processor, and storing programming instructions for execution by the at least one processor and causing the apparatus to:

receive a first frame, wherein the first frame comprises an aggregation control field, the aggregation control field comprises a first control subfield, the first control subfield comprises a control identifier and first control information corresponding to the control identifier, the first control information comprises an extended control subfield, the extended control subfield comprises an extended control identifier and second control information corresponding to the extended control identifier, the first control information is m bits, m<26, m is a positive integer, the control identifier is a first value, and the first value is a value from 9 to 15, and when the control identifier is the first value, the first control subfield is a last control subfield in the aggregation control field; and obtain the second control information in the extended control subfield.

7. The apparatus according to claim 6, wherein a second station is an extremely high throughput (EHT) station or a next generation station of an EHT;

when the extended control identifier is a second value, the extended control identifier indicates the second station to ignore a bit after the extended control identifier in the aggregation control field; and the apparatus further comprises:

ignoring, by the second station, the bit after the extended control identifier in the aggregation control field.

8. The apparatus according to claim 7, wherein the first control subfield is a 1st control subfield in the aggregation control field or a unique control subfield in the aggregation control field, and the extended control identifier is located at a beginning part of the second control information.

9. The apparatus according to claim 7, wherein the second value is a value of 15, 31, or 63.

10. The apparatus according to claim 6, wherein the first control subfield further comprises a padding subfield; and if the extended control identifier is n bits, a value of the extended control identifier is 0, and the second control information is greater than 26-2*n bits, all bits of the padding subfield are 0; or all the bits of the padding subfield are 1.

11. A communication method, wherein the method comprises:

generating, by a first station, a first frame, wherein the first frame comprises an aggregation control field, the aggregation control field comprises a first control subfield, the first control subfield comprises a control identifier and first control information corresponding to the control identifier, the first control information comprises an extended control subfield, the extended control subfield comprises an extended control identifier and second control information corresponding to the extended control identifier, the first control information is m bits, m<26, is a positive integer, the control identifier is a first value, and the first value is a value from 9 to 15, and when the control identifier is the first value, the first control subfield is a last control subfield in the aggregation control field; and sending, by the first station, the first frame to a second station.

12. The method according to claim 11, wherein the second station is an extremely high throughput (EHT) station or a next generation station of an EHT; and when the extended control identifier is a second value, the extended control identifier indicates the second station to ignore a bit after the extended control identifier in the aggregation control field.

13. The method according to claim 12, wherein the first control subfield is a 1st control subfield in the aggregation control field or a unique control subfield in the aggregation control field, and the extended control identifier is located at a beginning part of the second control information.

14. The method according to claim 12, wherein the second value is a value of 15, 31, or 63.

15. The method according to claim 11, wherein the first control subfield further comprises a padding subfield; and if the extended control identifier is n bits, a value of the extended control identifier is 0, and the second control information is greater than 26-2*n bits, all bits of the padding subfield are 0; or all the bits of the padding subfield are 1.

* * * * *